United States Patent [19]

Laughlin

[11] Patent Number: 4,778,990

[45] Date of Patent: Oct. 18, 1988

[54] RADIANT ENERGY RECEIVING AND DIRECTING APPARATUS AND METHOD

[75] Inventor: Richard H. Laughlin, Richardson, Tex.

[73] Assignee: Varo, Inc., Garland, Tex.

[21] Appl. No.: 11,738

[22] Filed: Feb. 6, 1987

[51] Int. Cl.⁴ .............................................. G01B 21/22
[52] U.S. Cl. ................... 250/227; 350/96.1; 356/141; 356/152
[58] Field of Search ............... 250/227, 578, 203 R; 350/96.1, 96.24–96.27; 356/141, 152, 340

[56] References Cited

U.S. PATENT DOCUMENTS

| | | | |
|---|---|---|---|
| 3,986,778 | 10/1976 | Mathisen et al. | 250/227 |
| 3,992,099 | 11/1976 | Laughlin | 250/203 |
| 4,625,108 | 11/1986 | Nestel et al. | 250/227 |

Primary Examiner—Edward P. Westin
Assistant Examiner—Charles Wieland
Attorney, Agent, or Firm—Jerry W. Mills; Jefferson Perkins

[57] ABSTRACT

A method and apparatus for receiving radiant energy to approximate a uniform and homogeneous radiant energy beam from a non-homogeneous beam by a sampling from the beam by an array of receiving ends of optical fibers. A first plurality of optical fibers have receiving ends disposed parallel to a first common plane and transmitting ends directed to a first detector. A second plurality of optical fibers have receiving ends disposed parallel to a second common plane and transmitting ends directed to a second detector. The first and second common planes are oriented with respect to each other at an predetermined angle for receiving radiant energy.

34 Claims, 2 Drawing Sheets

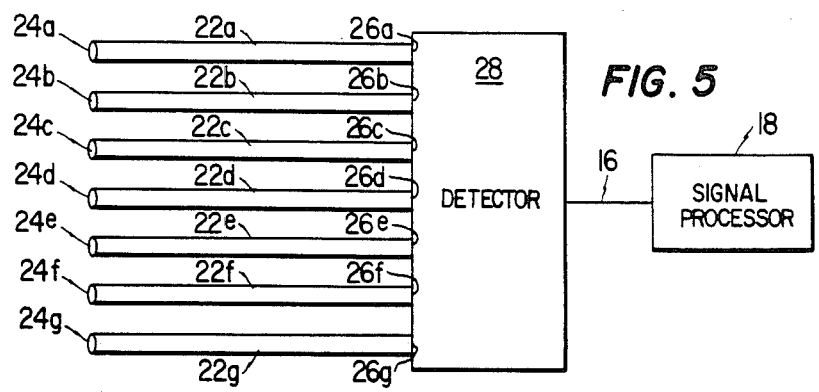
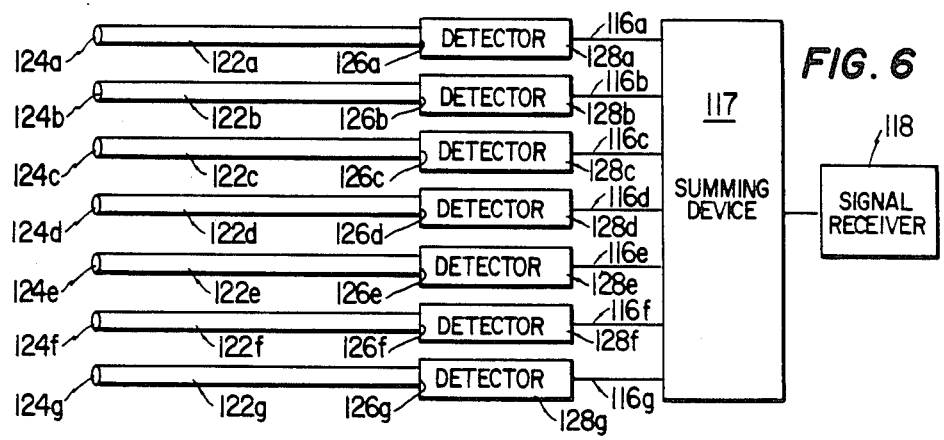
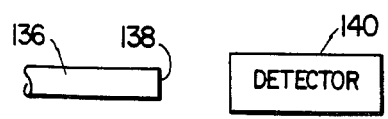
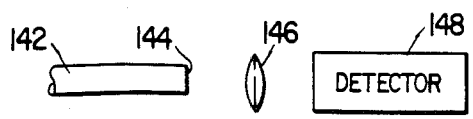
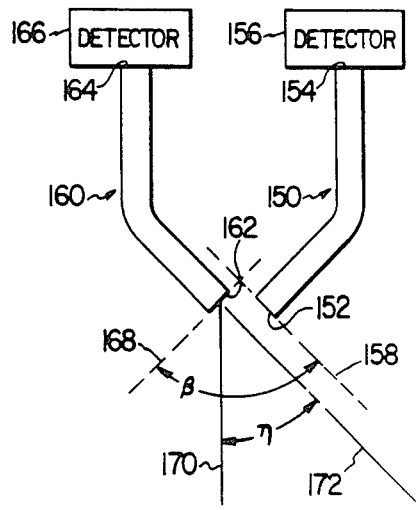

RADIANT ENERGY RECEIVING AND DIRECTING APPARATUS AND METHOD

TECHNICAL FIELD OF THE INVENTION

This invention relates generally to methods and apparatus for detecting optical energy, and more particularly to fiber optics apparatus and methods for receiving radiant energy to determine the angle of arrival and/or the wavelength of the radiant energy.

BACKGROUND OF THE INVENTION

U.S. Pat. No. 3,992,099 to Laughlin, incorporated herein by reference, discloses a source discriminator for measuring the angle of arrival and wavelength of beams of radiant energy. Such a system is useful in combat applications as a threat warning system to provide information about the source of ranging laser beams and the like. The source discriminator described in the Laughlin patent includes first and second planar radiant energy detectors transversely oriented relative to one another to receive radiant energy. Each of the detectors produces an electrical output signal corresponding to radiant energy which impinges on the detector. The output signals are used to determine the angle of arrival and wavelength of the radiant energy impinging upon the planar detectors. The detectors have an angular response approximated by the cosine function.

However, it has been found that many radiant energy beams, such as laser beams, to be detected by the device are non-homogeneous and have hot spots, or varying optical gradients, across the cross-section of the beam. This non-homogeneity of the beam adversely affects the accuracy of prior detector systems. An additional problem arises from a passivating overcoat layer typically included on the surface of prior planar detectors used in systems such as disclosed in the Laughlin U.S. Pat. No. 3,992,099. The passivating overcoat layer acts as a transmission line whose characteristics vary as a function of both the wavelength and the polarization of radiant energy impinging upon the passivating overcoat surface. Variations caused by the passivating overcoat thus adversely affect the accuracy of results determined by prior detecting systems. It has also been found that reflections and shadowing from the detector mounting and detector electrode post used with prior systems can adversely affect the accuracy of the system.

A need has thus arisen for an improved radiant beam discriminator which minimizes or eliminates the effects of non-homogeneous radiant energy beams, and which reduces inaccuracies caused by passivating overcoats or mounting reflections and shadowing.

SUMMARY OF THE INVENTION

The present invention comprises apparatus and methods for receiving and directing radiant energy to a radiant energy detector. Disclosed herein is a method and apparatus to approximate a uniform and homogeneous radiant energy beam from a non-homogeneous beam by an interleaved sampling of the beam. An interleaved array of optical fibers samples the beam and directs radiant energy from the beam to radiant energy detectors.

A first and second plurality of optical fibers are provided. Each optical fiber is adapted to receive radiant energy at a radiant energy receiving end, to transmit at least a portion of the received radiant energy along the longitudinal axis of the optical fiber, and to transmit at least a portion of the received radiant energy from a transmitting end of the optical fiber. The transmitting end of each of the first plurality of optical fibers is positioned to direct radiant energy from the optical fiber to a radiant energy detector, which sums or averages the outputs from the optical fibers. The transmitting end of each of the second plurality of optical fibers is positioned to direct radiant energy from the optical fiber to a radiant energy detector, which sums or averages the optical fiber outputs. The radiant energy receiving ends of the first plurality of optical fibers are positioned on or parallel to a first plane surface and are interleaved with the radiant energy receiving ends of the second plurality of optical fibers which are positioned on or parallel to a second plane surface. The first and second plane surfaces are oriented relative to one another at a selected angle.

Radiant energy to be detected is received at the first and second plane surfaces by the radiant energy receiving end of the optical fibers. At least a portion of the radiant energy received is transmitted along the longitudinal axis of the optical fibers and transmitted to a radiant energy detector from the transmitting end of the optical fibers. Due to the summing or averaging from the plurality of fiber optics, optical gradients or non-homogeneities in the radiant energy beam tend to cancel out, and their effect is substantially reduced or eliminated.

The invention reduces the problems arising from the non-homogeneity of the radiant energy beam being detected.

In accordance with another aspect of the present invention, more than one detector can be used for detecting the radiant energy received from either or both of the first and second plurality of optical fibers. For example, a separate detector may be disposed to receive radiant energy from the transmitting end of each optical fiber, with an output from each of the detectors receiving radiant energy from the first plurality of optical fibers being summed together and an output from each of the detectors receiving radiant energy from the second plurality of optical fibers being summed together.

Additionally, the receiving end of the optical fiber may be treated or otherwise provided with a diffusing surface to minimize any alterations which may occur to the characteristics of the radiant energy impinging on the receiving ends of the optical fibers as that radiant energy is received by the optical fiber.

Also, the receiving ends of the first and second plurality of optical fibers may be arrayed in a non-interleaved fashion but in an arrangement which also serves to minimize effects arising from the non-homogeneity of the impinging radiant energy beam.

BRIEF DESCRIPTION OF THE DRAWINGS

For a more complete understanding of the invention and the advantages thereof, reference is now made to the following description, taken in conjunction with the accompanying drawings in which:

FIG. 5 is a schematic of a side view of a first plurality of optical fibers of the embodiment of the present invention shown in FIG. 3;

FIG. 6 is a schematic of a side view of a first plurality of optical fibers of a second embodiment of the present invention showing each of the optical fibers connected to a separate radiant energy detector which in turn is coupled to apparatus for summing the output signals of the separate detectors;

FIG. 7 is a side view of the transmitting end of an optical fiber directly butted to a radiant energy detector in accord with one embodiment of the present invention;

FIG. 8 is a side view of the transmitting end of an optical fiber proximity focused on a radiant energy detector in accordance with another embodiment of the present invention;

FIG. 9 is a side view of the transmitting end of an optical fiber coupled by a lens means to a radiant energy detector in accord with another embodiment of the present invention; and FIG. 10 is a top view of an embodiment of the present invention wherein a first plurality of optical fibers are not arranged to cross a second plurality of optical fibers.

DETAILED DESCRIPTION OF THE INVENTION

Figure 1:
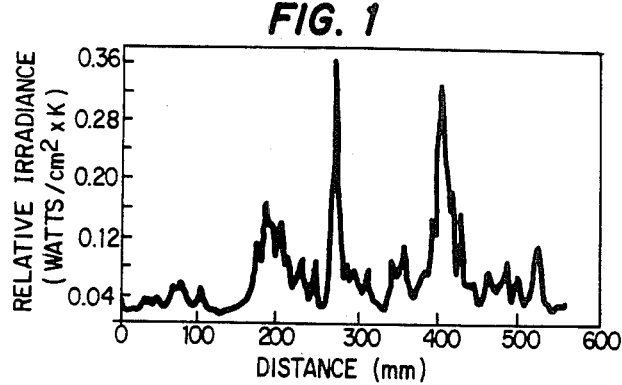
FIG. 1 is a graph of the optical gradient, expressed as relative irradiance versus cross-sectional distance, for a typical radiant energy beam.

FIG. 1 shows a typical optical gradient expressed as a function of distance for a radiant energy beam to be detected. The figure shows the relative radiance of a typical laser beam as a function of cross-sectional distance in the beam. Units for the distance in this figure are in millimeters. The units for relative radiance are in watts per centimeter squared multiplied by K where K is a constant. FIG. 1 shows that the typical laser beam is not homogeneous across its width and has higher and lower levels of relative radiance. It is this non-homogeneous nature of the laser beam which makes it difficult to accurately measure aspects of the beam.

Figure 2:
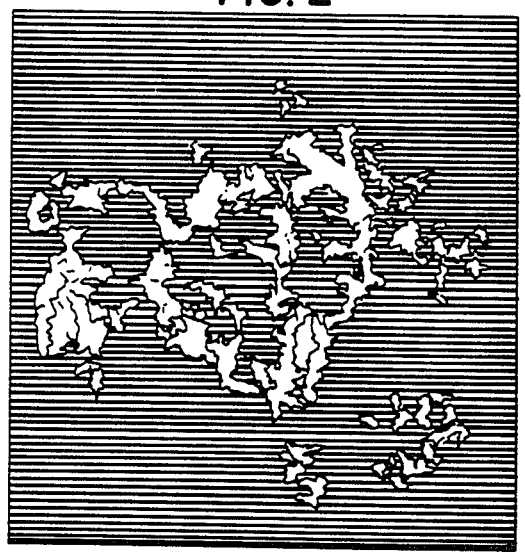
FIG. 2 is a representation of a photograph of a typical radiant energy beam.

FIG. 2 shows a photographic representation of a typical radiant energy beam such as would be received and transmitted with the device of the present invention. The light areas of the photograph represent areas of higher intensity radiant energy and the cross-hatched areas represent areas of lower intensit radiant energy.

Radiant energy beams are not homogeneous for several reasons. One reason is that a typical generator for a radiant energy beam, such as a laser, generates a beam having multiple hot spots, or high energy areas, within that beam. Another reason is that even if a homogeneous or uniform radiant energy beam were generated, after it passed through several kilometers of the earth's atmosphere, the optical gradients within the atmosphere and the turbulence therein would cause severe variations in the relative radiant energy of the beam, resulting in a varying optical gradient across the cross section of the beam.

Figure 3:
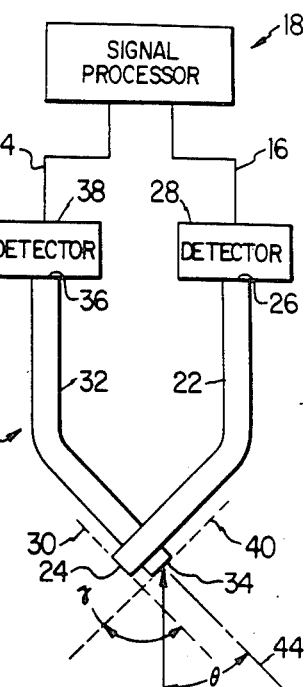
FIG. 3 is a top, somewhat diagramatic, view of apparatus for directing radiant energy to a radiant energy detector in accordance with one embodiment of the present invention.

In FIG. 3 there is shown a diagramatic top view of radiant energy receiving and directing apparatus of the present invention. A radiant energy receiving and directing system 10 is positioned to receive radiant energy from a radiant energy source 12 and is operably connected through signal communication channels 14 and 16 to a signal receiver and processor 18. An optical fiber 22 includes a radiant energy receiving end 24 and a radiant energy transmitting end 26. Transmitting end 26 is directed towards radiant energy detector 28. Receiving end 24 is disposed on or parallel to a first radiant energy receiving plane 30. A second optical fiber 32 includes a receiving end 34 and a transmitting end 36. Transmitting end 36 is directed towards radiant energy detector 38. Receiving end 34 is disposed on a second radiant energy receiving plane 40. Planes 30 and 40 intersect and are oriented with respect to each other at a predetermined angle $\gamma$ (by the geometric definition of opposite angles) for receiving radiant energy. The angle $\gamma$ between planes 30 and 40 is 90° in the embodiment of FIG. 3, although the angle $\gamma$ can be varied from any angle between 10°-170°, depending upon the desired application. It will be understood that optical fibers 22 and 32 are the top optical fibers of vertical arrays of optical fibers which will be shown in subsequent figures and later described.

For purposes of explanation, the direction of impingement of a radiant energy beam impinging on receiving end 34 is shown by line 42. The longitudinal axis of fiber optic 32 at the receiving end 34 is shown by line 44. Angle $\theta$ is the angle between longitudinal axis 44 and direction of impinging radiant energy 42.

In the operation of the embodiment of the present invention shown in FIG. 3, radiant energy is received by the radiant energy receiver and directing system 10 from the radiant energy source 12. Radiant energy impinges on the receiving ends 24 and 34 of fiber optics 22 and 32. At least a portion of the radiant energy impinging on the receiving ends 24 and 34 is transmitted along the length of the respective fiber optics 22 and 32 to the transmitting ends 26 and 36 of the respective fiber optics. At least a portion of this radiant energy is transmitted from the transmitting ends 26 and 36 of fiber optics 22 and 32 respectively to the radiant energy detectors 28 and 38 respectively. Radiant energy detectors 28 and 38 generate output signals correlated to the radiant energy transmitted to the detectors and transmit those signals via signal communication channels 14 and 16 to a signal receiver and processor 18. The signal receiver and processor comprise one or more ammeters which operate on the signal information as set forth in U.S. Pat. No. 3,992,099, in order to determine the angle and wavelength of the radiant energy as described in the patent. Alternatively, receiver and processor 18 may comprise a digital computer programmed to perform the calculations described in U.S. Pat. No. 3,992,099.

Figure 4:
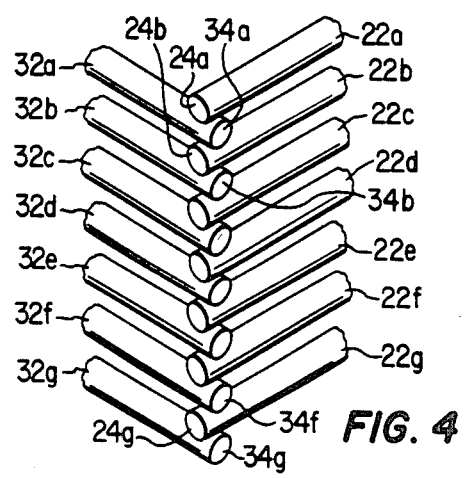
FIG. 4 is a isometric drawing of an elevated front view of an array of optical fiber receiving ends in accordance with an embodiment of the present invention.

FIG. 4 is an elevated isometric front view of the array of optical fiber receiving ends of the invention shown in FIG. 3. A first plurality of optical fibers 22a-22g is provided with receiving ends 24a-24g, all vertically disposed on or parallel to the radiant energy receiving plane 30, not shown in the FIGURE. Similarly, a second plurality of optical fibers 32a-32g is provided also having radiant energy receiving ends 34a-34g disposed on or parallel to the second radiant energy receiving plane 40, not shown in the FIGURE. The receiving ends 24a-24g of the first plurality of optical fibers 22a-22g are interleaved and crossed with the receiving ends 34a-34g of the second plurality of optical fibers 32a-32g. The radiant energy receiving ends 24a-24g and 34a-34g may have disposed thereon diffused surfaces, not shown in the FIGURE, as disclosed in the inventor's copending application Ser. No. 07/011,678 incorporated herein by reference. The first and second radiant energy receiving plane surfaces are oriented with respect to each other at the predetermined angle γ for receiving radiant energy.

The present invention avoids problems arising from the non-homogeneity of the radiant energy beam by taking multiple small samples from the beam which can be averaged to arrive at a radiance value which can be used in later calculations. It will be understood that the greater the number of fiber optics used in the detecting array, the greater the accuracy of the system, as more non-linearity from the signal will be removed. In practical embodiments, a trade off is made between the fiber size, the number of fibers, the desired signal level for detection and the amount of nonuniformity in the radiant energy beam sensed that can be tolerated. Additionally, an interleaved arrangement, an example of which is shown in FIG. 4, as well as the proximity of the receiving ends of the first plurality of optical fibers with receiving ends of the second plurality of optical fibers tends to average out inaccuracies which might otherwise have arisen due to non-homogenity of the radiant energy beam being received. The methods of the multiple small samplings of the embodiments of the present invention thus serve to approximate a uniform and homogeneous radiant beam by the sampling of a non-homogeneous beam.

Each receiving end $24a-24g$ and $34a-34g$ receives radiant energy from the portion of the radiant energy beam which impacts on those receiving ends. By transmitting this received radiant energy to the detector, an average radiance for the impacting radiant energy beam is gained and the beam appears uniform to the system, thereby enabling greater accuracy in calculations made on the basis of the detector output signals.

The fiber optics can be of varying lengths from as short as 3-5 millimeters or less up to several meters or more in length. One embodiment utilized a fiber optic length of about 10 centimeters.

It should be understood that although the arrangement of vertically linear arrays of fiber optics shown in FIG. 4 provides certain advantages, it is not necessary that the receiving ends of each plurality of optical fibers be so disposed. The fibers may be arranged in other array configurations, so long as the receiving ends of the optical fibers are disposed on the same or parallel radiant energy receiving planes.

FIG. 5 is a side view of the first plurality of optical fibers of the invention shown in FIGS. 3 and 4. As previously described, each of the first plurality of optical fibers $22a-22g$ has, respectively, a radiant transmitting end $26a-26g$, with each transmitting end $26a-26g$ directed toward radiant energy detector 28. Each of the receiving ends $24a-24g$ is disposed on or parallel to a first radiant energy receiving plane, not shown in FIG. 5. Detector 28 is operably connected through signal communication channel 16 to signal receiver and processor 18. It will be understood that the second plurality of optical fibers $32a-32g$ are arranged in parallel fashion to the first plurality of optical fibers $22a-22g$ shown in FIG. 5, having receiving ends and transmitting ends, with the transmitting ends directed towards a radiant energy detector which in turn is operably connected to signal receiver and processor 18.

A side view of another preferred embodiment of the present invention is shown in FIG. 6 which shows a first plurality of optical fibers $122a-122g$ having receiving ends $124a-124g$ and transmitting ends $126a-126g$, with each transmitting end $126a-126g$ directed towards a separate one of a first plurality of detectors $128a-128g$, respectively. Each detector $128a-128g$ is operably connected by communication channels $116a-116g$ to a summing device 117 which can be connected to or incorporated into a signal receiver 118. Each receiving end $124a-124g$ is disposed on or parallel to a first receiving plane. Each receiving end $124a-124g$ may have disposed thereon a diffused surface as set forth in the inventor's co-pending previously noted application Ser. No. 07/011,628.

At least a portion of the radiant energy received at each receiving end $124a-124g$ is transmitted along the respective optical fiber $122a-122g$ to a transmitting end $126a-126g$, where at least a portion of the radiant energy is transmitted to a separate one of the first plurality of detectors $128a-128g$. Output signals from each detector $128a-128g$ corresponding to the radiant energy detected are communicated via the communication channels $116a-116g$ to the summing device 117 which sums the output signals from each of the first plurality of detectors $128a-128g$ and communicates the results to the signal receiver 118.

It will be understood that although not shown in FIG. 6, the embodiment includes a second plurality of optical fibers disposed in a parallel arrangement to the first plurality $122a-122g$ shown in FIG. 6; each directed towards a separate detector which in turn is operably connected to a summing device and the signal receiver 118. Taking the electrical sum of the signals from the first plurality of detectors, in comparison with the electrical sum of output signals from the second plurality of detectors, has the effect of averaging out the optical gradients of the beam impinging on the receiving ends of the optical fibers.

Referring now to FIG. 7, an optical fiber 130 is shown with transmitting end 132 directly butted to radiant energy detector 134. However, as shown in FIG. 8, the transmitting end of the optical fiber 130 need not be directly butted to the detector. FIG. 8 illustrates that optical fiber 136 may have transmitting end 138 spaced from and proximity focused on radiant energy detector 140.

FIG. 9 shows yet another embodiment, wherein an optical fiber 142 has a transmitting end 144 coupled by a lens 146 to radiant energy detector 148.

FIG. 10 shows an embodiment which illustrates that it is not necessary that the optical fibers of the first plurality of optical fibers be interleaved or crossed with the optical fibers of the second plurality of optical fibers. The receiving ends of the first and second pluralities of optical fibers may be disposed in a facing arrangement without the fibers crossing. Optical fiber 150, illustrative of a first plurality of optical fibers, has a receiving end 152 and transmitting end 154. Transmitting end 154 is disposed to transmit radiant energy from the optical fiber 150 to radiant energy detector 156. Receiving end 152 is disposed on or parallel to a first radiant energy receiving plane 158. Optical fiber 160, illustrative of a second plurality of optical fibers, has a receiving end 162 and transmitting end 164. Transmitting end 164 is disposed to transmit radiant energy to radiant energy detector 166. Receiving end 162 is disposed on or parallel to a second radiant energy receiving plane 168. First receiving plane 158 and second receiving plane 168 intersect and are oriented with respect to each other at a predetermined angle β for receiving radiant energy. Although angle β can vary as described above, in the embodiment of FIG. 10, angle β is set at a predetermined angle of 90°. As can be seen, the receiving ends 152 an 162 of optical fibers 150 and 160 are disposed in a facing arrangement without the fibers being interleaved and crossing as they are in the embodiment shown in FIG. 4.

For purposes of explanation, the direction of impingement of a radiant energy beam impinging on receiving end 162 is shown by line 170. The longitudinal axis of fiber optic 160 at the receiving end 162 is shown by line 172. Angle $\eta$ is the angle between longitudinal axis 172 and direction of impinging radiant energy 170.

The similarities in the geometries of the embodiments shown in FIGS. 3 and 10 should be noted. Although the optical fibers of the first and second pluralities of optical fibers of FIG. 3 are crossed, the angle $\gamma$ between the first and second receiving planes is 90° just as is angle $\beta$ of the embodiment shown in FIG. 10 wherein the optical fibers are not crossed. So too, although the receiving ends of the first and second pluralities of optical fibers in the embodiment of FIG. 3 face away from each other, the angle of impingement $\theta$ is the same as the angle of impingement $\eta$ (assuming the directions of impingement 42 and 170 are of equal relative orientations to the receiving planes) even though the receiving surfaces of FIG. 10 face each other.

The angle between the radiant energy receiving plane of the first plurality of optical fibers and the radiant energy receiving plane of the second plurality of optical fibers can be varied from any angle between 10°–170°, depending on the desired application.

The detectors used may consist of silicon pin diodes or any other detector of optical energy including mercet, platinum silicide or any other detector of optical energy.

Use of the present invention should provide a system capable of measuring the angle of light incident on the receiving ends of the optical fibers to an accuracy of normally 20° to between 2° to ½ of a degree.

While the invention has been described with respect to preferred embodiments, it is to be understood that the invention is capable of numerous modifications, rearrangement and changes that are within the scope of the invention as defined by the appended claims:

What is claimed is:

1. Apparatus for receiving radiant energy comprising:
    a first plurality of optical fibers each having a receiving end disposed parallel to a first common plane for receiving radiant energy, each optical fiber further including a longitudinal axis for transmitting at least a portion of the received radiant energy and each optical fiber further including a transmitting end;
    a first detector for receiving radiant energy from said transmitting ends of said first plurality of optical fibers;
    a second plurality of optical, fibers each having a receiving end disposed parallel to a second common plane for receiving radiant energy, each optical fiber further including a longitudinal axis for transmitting at least a portion of the received radiant energy and each optical fiber further including a transmitting end;
    a second detector for receiving radiant energy from said transmitting ends of said second plurality of optical fibers;
    said first and second common planes being oriented with respect to each other at a predetermined angle for receiving radiant energy.

2. Apparatus for receiving radiant energy of claim 1, wherein said receiving ends of said first plurality of optical fibers are interleaved and crossed with said receiving ends of said second plurality of optical fibers.

3. Apparatus for receiving radiant energy of claim 1, wherein said first detector comprises separate detectors for receiving radiant energy from each of said transmitting ends of said first plurality of optical fibers,
    and wherein said second detector comprises separate detectors for receiving radiant energy from each of said transmitting ends of said second plurality of optical fibers.

4. Apparatus for receiving radiant energy of claim 2, wherein said first detector comprises separate detectors for receiving radiant energy from each of said transmitting ends of said first plurality of optical fibers, and
    wherein said second detector comprises separate detectors for receiving radiant energy from each of said transmitting ends of said second plurality of optical fibers.

5. Apparatus for directing radiant energy of claim 1, wherein said transmitting end of each optical fiber is directly butted to a radiant energy detector.

6. Apparatus for directing radiant energy of claim 1, wherein said transmitting end of each optical fiber is proximity focused to one of said radiant energy detectors.

7. Apparatus for directing radiant energy of claim 1 and further comprising:
    a lens disposed between said transmitting end of each optical fiber and said radiant energy detector.

8. Apparatus for directing radiant energy of claim 4, wherein the transmitting end of each optical fiber is directly butted to a radiant energy detector.

9. Apparatus for directing radiant energy of claim 4, wherein the transmitting end of each optical fiber is proximity focused to a radiant energy detector.

10. Apparatus for directing radiant energy of claim 4 and further comprising
    a lens disposed between said transmitting end of each optical fiber and each radiant energy detector.

11. The apparatus for directing radiant energy of claim 2 wherein said apparatus serves to approximate a homogeneous radiant energy beam by an interleaved sampling of a non-homogeneous radiant energy beam.

12. Apparatus for receiving radiant energy for use in source discriminator systems which determine the angle of arrival of radiant energy received, comprising:
    a first plurality of optical fibers each having a receiving end, a transmitting end, and a longitudinal axis, each said receiving end disposed parallel to a first common plane for receiving radiant energy,
    a first detector for receiving radiant energy from said transmitting ends of said first plurality of optical fibers and operable to generate signals corresponding to the radiant energy received by said first detector;
    a second plurality of optical fibers each having a receiving end, a transmitting end and a longitudinal axis, each said receiving end disposed parallel to a second common plane for receiving radiant energy;
    a second detector for receiving radiant energy from said transmitting ends of said second plurality of optical fibers and operable to generate signals corresponding to the radiant energy received by said second detector;

said first and second common planes being oriented with respect to each other at a predetermined angle;

a signal processor and channels for communicating said signals generated by said first and second detectors to said signal processor;

wherein said first and second plurality of optical fibers are adapted to receive radiant energy at said receiving ends, transmit at least a portion of said received radiant energy along said longitudinal axis of said optical fibers and further transmit at least a portion of said received radiant energy to said first and second detectors respectively;

wherein signals generated by said first and second detectors corresponding to said radiant energy received by said detectors are communicated by said channels to said signal processor and used by said signal processor in determining the angle of arrival of radiant energy received by said apparatus for receiving radiant energy.

13. Apparatus for receiving radiant energy of claim 12 wherein said receiving ends of said first plurality of optical fibers are interleaved and crossed with said receiving ends of said second plurality of optical fibers.

14. Apparatus for receiving radiant energy of claim 12 wherein said first detector comprises a separate detector for receiving radiant energy from each of said transmitting ends of said first plurality of optical fibers and wherein said second detector comprises a separate detector for receiving radiant energy from each of said transmitting ends of said second plurality of optical fibers.

15. Apparatus for receiving radiant energy of claim 13 wherein said first detector comprises a separate detector for receiving radiant energy from each of said transmitting ends of said first plurality of optical fibers and wherein said second detector comprises a separate detector for receiving radiant energy from each of said transmitting ends of said second plurality of optical fibers.

16. A fiber optics array for receiving radiant energy comprising:

an array of receiving ends of first and second pluralities of optical fibers, said receiving ends of said first plurality of optical fibers being disposed parallel to a first radiant energy receiving plane, said receiving ends of said second plurality of optical fibers being disposed parallel to a second radiant energy receiving plane, said first and second radiant energy receiving planes intersecting and being oriented with regard to each other at a predetermined angle, and means for receiving radiant energy from said optical fibers and summing signals corresponding to said radiant energy, in order to minimize the effects of non-homogeneous portions of the radiant energy received at said receiving ends.

17. The array of claim 16, wherein said receiving ends of each of said first plurality of optical fibers are interleaved and crossed with said receiving ends of said second plurality of optical fibers.

18. The array of claim 16 wherein said array serves to approximate a homogeneous radiant energy beam by a sampling of a non-homogeneous radiant energy beam.

19. The array of claim 16 wherein the predetermined angle of orientation between said first and second radiant energy receiving planes is between 10° and 170°.

20. The array of claim 17 wherein said array serves to approximate a homogeneous radiant energy beam by a sampling of a non-homogeneous radiant energy beam.

21. The array of claim 17 wherein the predetermined angle of orientation between said first and second radiant energy receiving planes is between 10° and 170°.

22. A method of receiving and directing radiant energy comprising:

disposing receiving ends of a first plurality of optical fibers parallel to a first common plane for receiving radiant energy;

disposing transmitting ends of said first plurality of optical fibers to transmit radiant energy to at least one first radiant energy detector;

disposing receiving ends of a second plurality of optical fibers parallel to a second common plane for receiving radiant energy;

disposing transmitting ends of said second plurality of optical fibers to transmit radiant energy to at least one second radiant energy detector;

orienting said first common plane at a predetermined angle with regard to said second common plane;

generating a signal from said one first radiant energy detector responsive to radiant energy transmitted from said first plurality of optical fibers to said one first radiant energy detector;

generating a signal from said one second radiant energy detector responsive to radiant energy transmitted from said second plurality of optical fibers to said one second radiant energy detector.

23. The method of claim 22, further comprising:

receiving radiant energy at the receiving end of at least one of the first plurality of optical fibers;

transmitting at least a portion of said received radiant energy from the receiving end along the length of said at least one of the first plurality of optical fibers to the transmitting end of the optical fibers and from the transmitting end to said first detector;

receiving radiant energy at the receiving end of at least one of the second plurality of optical fibers;

transmitting at least a portion of said received radiant energy from the receiving end along the length of said at least one of the second plurality of optical fibers to the transmitting end of the optical fiber and from the transmitting end to said second detector.

24. The method of claim 23, further comprising:

processing said signals generated by said first and second detectors to determine the angle of arrival of radiant energy received at the receiving ends of the first and second pluralities of optical fibers.

25. The method of claim 24, further comprising:

disposing said receiving ends of said first and second pluralities of optical fibers in an array such that said receiving ends of said first plurality of optical fibers are interleaved and crossed with said receiving ends of said second plurality of optical fibers.

26. The method of claim 24, further comprising:

disposing each transmitting end of said first plurality of optical fibers to transmit radiant energy to a separate one of a first plurality of radiant energy detectors; and disposing each transmitting end of said second plurality of optical fibers to transmit radiant energy to a separate one of a second plurality of radiant energy detectors.

27. The method of claim 26, further comprising:
generating a signal from each of said first plurality of radiant energy detectors;
generating a signal from each of said second plurality of radiant energy detectors; and
processing said signals generated by said first and second pluralities of radiant energy detectors to determine the angle of arrival of radiant energy received at said receiving ends of said first and second pluralities of optical fibers.

28. The method of claim 27, further comprising:
disposing said receiving ends of said first and second pluralities of optical fibers in an array such that said receiving ends of said first plurality of optical fibers are crossed and interleaved with said receiving ends of said second plurality of optical fibers.

29. A method for receiving radiant energy to be used in a device calculating the angle of arrival of said radiant energy, comprising:
receiving radiant energy from a radiant energy source at receiving ends of a first and second plurality of optical fibers;
disposing said receiving ends of said first plurality of optical fibers parallel to a first common plane;
disposing said receiving ends of said second plurality of optical fibers parallel to a second common plane;
orienting said first and second common planes at a predetermined angle with respect to each other;
disposing transmitting ends of said first plurality of optical fibers to transmit radiant energy from said transmitting end to at least one first detector;
disposing transmitting ends of said second plurality of optical fibers to transmit radiant energy from said transmitting ends to at least one second detector;
transmitting at least a portion of said radiant energy received at said receiving ends of said first plurality of optical fibers along the length of said optical fibers to said transmitting ends of said optical fibers and further transmitting at least a portion of said radiant energy to at least one first detector;
transmitting at least a portion of said radiant energy received at said receiving ends of said second plurality of optical fibers along the length of said optical fibers to said transmitting ends of said optical fibers and further transmitting at least a portion of said radiant energy to at least one said second detector;
generating a signal at said first detector responsive to the radiant energy transmitted to said first detector;
generating a signal at said second detector responsive to the radiant energy transmitted to said second detector;
communicating said signals generated by said first and second detectors to a processor;
processing said signals generated by said first and second detectors to determine the angle of arrival of the radiant energy received at the receiving ends of said first and second pluralities of optical fibers.

30. The method of claim 29, further comprising:
disposing transmitting ends of each of the first plurality of optical fibers to transmit radiant energy to a separate one of a first plurality of detectors; and
disposing transmitting ends of each of the second plurality of optical fibers to transmit radiant energy to a separate one of a second plurality of detectors.

31. The method of claim 29, further comprising interleaving and crossing the receiving ends of the first plurality of optical fibers with the receiving ends of the second plurality of optical fibers.

32. The method of claim 29, whereby an approximation of a homogeneous radiant energy beam is obtained by a sampling of a non-homogeneous radiant energy beam received from said radiant energy source.

33. The method of claim 23, whereby an approximation of a homogeneous radiant energy beam is obtained by a sampling of a non-homogeneous radiant energy beam received at said receiving ends.

34. A method, for use in determining the angle of arrival of radiant energy, of receiving radiant energy and to reduce inaccuracies caused by non-homogenity of the radiant energy being received, comprising:
disposing receiving ends of a first plurality of optical fibers parallel to first common plane;
disposing receiving ends of a second plurality of optical fibers parallel to a second common plane;
interleaving and crossing the receiving ends of the first plurality of optical fibers with the receiving ends of the second plurality of optical fibers; and
receiving radiant energy at the receiving ends of the first and second pluralities of optical fibers.

* * * * *